(12) United States Patent
Probst et al.

(10) Patent No.: US 9,527,232 B2
(45) Date of Patent: Dec. 27, 2016

(54) INJECTION MOLDING METHOD FOR MODIFYING A SURFACE OF AN APOLAR POLYMER MOLDED BODY, AND MULTI-LAYER FOIL SUITABLE FOR SAID METHOD

(75) Inventors: Werner A. Probst, Hildisrieden (CH); Bruno Traber, Münsingen (CH)

(73) Assignee: NOLAX AG, Sempach Station (CH)

( * ) Notice: Subject to any disclaimer, the term of this patent is extended or adjusted under 35 U.S.C. 154(b) by 932 days.

(21) Appl. No.: 13/638,980

(22) PCT Filed: Apr. 5, 2011

(86) PCT No.: PCT/EP2011/055268
§ 371 (c)(1),
(2), (4) Date: Nov. 6, 2012

(87) PCT Pub. No.: WO2011/124569
PCT Pub. Date: Oct. 13, 2011

(65) Prior Publication Data
US 2013/0221569 A1    Aug. 29, 2013

(30) Foreign Application Priority Data
Apr. 6, 2010   (EP) .................................... 10159085

(51) Int. Cl.
B29C 45/16    (2006.01)
B29C 45/14    (2006.01)
B32B 27/08    (2006.01)

(52) U.S. Cl.
CPC ..... B29C 45/1657 (2013.01); B29C 45/14811 (2013.01); B32B 27/08 (2013.01); B29K 2715/006 (2013.01)

(58) Field of Classification Search
USPC .......................................... 425/259; 156/305
See application file for complete search history.

(56) References Cited

U.S. PATENT DOCUMENTS

| | | | |
|---|---|---|---|
| 5,200,274 A | 4/1993 | Chung et al. | |
| 5,302,418 A | 4/1994 | Chung et al. | |
| 6,003,895 A | 12/1999 | Niwa et al. | |
| 6,399,168 B1* | 6/2002 | Sato et al. | 428/31 |
| 2006/0019088 A1* | 1/2006 | Wang et al. | 428/327 |
| 2006/0177634 A1* | 8/2006 | Lazar et al. | 428/156 |

FOREIGN PATENT DOCUMENTS

| | | |
|---|---|---|
| CA | 876666 | 7/1971 |
| DE | 10239762 | 3/2004 |
| DE | 10250067 | 5/2004 |
| EP | 1037717 | 9/2000 |
| EP | 1190008 | 3/2002 |

OTHER PUBLICATIONS

"Solid surface energy data (SFE) for common polymers"; www.surface-tension.de/solid-surface-energy.htm XP-002599453, Date: Nov. 20, 2007.

* cited by examiner

*Primary Examiner* — Alison L Hindenlang
*Assistant Examiner* — Mohamed K Ahmed Ali
(74) *Attorney, Agent, or Firm* — Davis & Bujold PLLC; Michael J. Bujold

(57) ABSTRACT

The invention relates to an injection molding method for modifying a surface of a polymer molded part (5) consisting of apolar polymer (4), wherein a multi-layer foil (1) consisting of at least one apolar layer (2) and a second layer (3) which has at least one surface property which is different from the first layer is back-molded.

4 Claims, 2 Drawing Sheets

Figure 1:
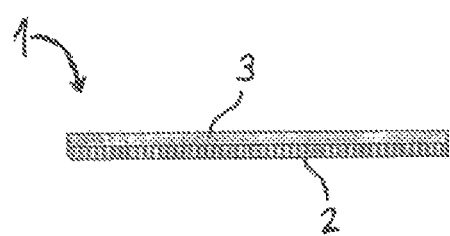

INJECTION MOLDING METHOD FOR MODIFYING A SURFACE OF AN APOLAR POLYMER MOLDED BODY, AND MULTI-LAYER FOIL SUITABLE FOR SAID METHOD

The invention relates to an injection-molding process for modifying a surface of a molding made of apolar polymer, to a multilayer foil suitable for this purpose, and also to a molded polymer article with a modified surface.

Polypropylene and reinforced polypropylene are low-cost plastics often used for injection-molded articles. Due to polypropylene's apolar properties, further processing of, or finishing of, the injection-molded articles is mostly not possible without pretreatment. Pretreatment is especially necessary in the case of adhesive bonding and of coating, since otherwise the adhesives and coatings have only inadequate adhesion on the surface.

There are various known methods for increasing the surface tension of apolar surfaces, in particular of polypropylene surfaces.

Firstly, the surface can be modified by electrical discharges, such as corona discharges or plasma discharges. DE 3340381 describes by way of example how the surface of polypropylene can be modified by corona-discharge treatment.

In another possibility, the surface is activated by aggressive media. Among these processes are acid etching, ozonolysis, fluorination, and swelling with solvents. CA 876666, U.S. Pat. No. 5,302,418, and U.S. Pat. No. 5,200,274, by way of example, describe various treatments.

The surface can moreover also be modified by applying dispersions, polymers and primers, as described by way of example in DE 10250067, EP 1190008, DE 10239762, or EP 1037717.

Other known processes are flame treatment of the surface and the use of fillers.

However, a great disadvantage of said processes is that an additional step is required in the production process. Furthermore, additional apparatuses are needed, which are sometimes complicated and expensive. Moreover, in particular the use of acids and solvents to treat surfaces causes high levels of environmental pollution.

It is an object of the present invention to avoid the disadvantages of the prior art and in particular to provide an injection-molding process which can minimize the number of steps needed to alter the surface of a molded polymer article made of an apolar polymer. A process as claimed in claim 1 achieves the object.

In the process according to the invention, a multilayer foil with at least one first apolar layer and with a second layer with at least one surface property different from the first layer is subjected to in-mold coating.

The in-mold coating of foils is a technology known per se in which a foil is first inserted into the cavity of an injection mold, or is clamped onto the injection mold. The foil is forced into the cavity and is deformed in accordance with the shape of the cavity. A polymer is then injected into the cavity, whereupon the foil side facing toward the polymer bonds to the polymer. Thus, molded articles are obtained, which are covered by a foil. Currently, mostly decorative foils are in-mold coated, for example by using the "inmold injection" (IMD) technology.

In the process according to the invention, a multilayer foil with at least one apolar layer and with at least one second layer with at least one surface property different from the first layer is inserted into the cavity of an injection mold in such a way that the first apolar layer faces toward the internal space of the cavity while the second layer makes contact with the internal wall of the cavity. The apolar polymer is then injected into the internal cavity of the mold. The injected polymer and the first apolar layer of the multilayer foil are in contact with each other in the mold, and consequently bond.

The second layer of the multilayer foil has at least one surface property, which differs from the first apolar layer. By way of example, the second layer has a structure or color that differs from that of the first apolar layer. However, it is preferable that the surface tension of the second layer differs from that of the first apolar layer. It is very particularly preferable that the second layer has polar properties.

For the purposes of this application, an apolar material and/or an apolar surface is one which has a surface tension of less than 35 mN/m. For the purposes of this application, a polar material and/or a polar surface is one which has a surface tension of more than 37 mN/m. Surface tension can be determined by using commercially available test inks. Various series of tests are defined in DIN 53364. Another possibility for determining surface tension is to measure what is known as the angle of contact or angle of wetting. Here, the angle between the surface and a water droplet is measured. The better the wettability of the surface, the smaller the angle. The angle is measured here by way of example by a goniometer.

The second layer is chosen in such a way that it is suitable as an adhesive. By way of example, the composition of the second layer can be such that it can be activated by exposure to heat or by a solvent. This has the advantage that a molded article produced by the injection-molding process according to the invention can be directly adhesive-bonded, or decorative elements and other elements, e.g. hooks, can be attached. Alternatively, the composition can be chosen in such a way that the second layer can be activated physically, for example by ultrasound or by high frequency. Alternatively, it is also possible that the second layer is designed in such a way that it can be activated by introducing heat, e.g. by infrared radiation.

The second layer of the multilayer foil preferably comprises, or consists of, a polar polymer selected from the group of polyamides, copolyamides, polyesters, copolyesters, polyurethanes, polyether-block-amides, acrylates, and polycarbonates, or mixtures thereof.

It is particularly preferable that the second layer comprises, or consists of, acrylonitrile-butadiene-styrene copolymer (ABS), as well as a blend thereof with polycarbonate (ABS/PC), polyamide (PA), or polyurethane (TPU). ABS and ABS/PC are particularly advantageously suitable here for subsequent electroplating, and TPU exhibits good affinity to coatings and paints.

The in-mold coated polymer, i.e. the polymer of which the molded polymer article consists, preferably comprises, or consists of, polypropylene. The polypropylene can also comprise fillers, in particular glass fibers, chalk, or talc. Alternatively, other plastics, which are difficult to process may be used as apolar polymers, for instance polyethylene, polyoxymethylene, thermoplastic elastomers, or ethyl-vinyl acetate, or copolymers and mixtures thereof.

The first apolar layer of the multilayer foil comprises, or consists of, an apolar polymer, in particular polypropylene, modified polypropylene, polyethylene, modified polyethylene, polyoxymethylene, ethyl-vinyl acetate, styrene block copolymers, ionomers, olefins, rubbers, or plastomers, or else copolymers and mixtures thereof.

Others additives and processing aids known in the foil industry, for example fillers or dyes, can be admixed with the polymers of the first and of the second layer.

Alternatively, the multilayer foil can have at least one further layer between the first apolar layer and the second layer. This at least one further layer can serve as adhesive-promoter or barrier layer between the first and the second layer. This at least one further layer can moreover also alter the properties of the multilayer foil, for example ultimate tensile strength, dimensional stability, harshness, or color.

The in-mold coating process according to the invention for producing a molded polymer article made of an apolar polymer is particularly advantageous in that the molded article can be adhesive-bonded to another substrate without further pretreatment of its surface. The surface can moreover easily be subjected to optical and mechanical finishing, for example by coating, powder coating, metal-coating, or electroplating, or else can be provided with functional protective layers.

The molded polymer articles which are produced by the injection-molding process according to the invention moreover have very homogenous surfaces. In particular, it is also possible to equip hidden sites with the desired properties, which are difficult or impossible to treat with the conventional modification processes.

Another object of the present invention is to provide a foil, which is suitable for equipping the surface of a molded article made of an apolar polymer with polar properties. A multilayer foil according to claim 9 achieves this object.

The multilayer foil according to the invention consists of at least one first apolar layer and of a second polar layer, whereby the apolar layer has a surface tension of less than 35 mN/m and the polar layer has a surface tension of more than 37 mN/m. It is particularly preferable that the difference between the surface tension of the apolar and the surface tension of the polar layer is 5 mN/m or more. The polymer composition of the second layer is chosen in such a way that the second layer is suitable as an adhesive.

By virtue of the apolar layer, the multilayer foil according to the invention enables good bonding to a molded article of an apolar polymer, while the second layer can provide, to the surface of the molded article, good adhesion properties for adhesives, paints, and the like. It is thus possible, by a simple process, preferably by in-mold coating, to equip a molded article made of an apolar polymer with a surface which, without additional treatment, can be reliably adhesive-bonded or coated.

Moreover, the polymer composition of the second layer is selected in such a way that the second layer is suitable as an adhesive. By way of example, the composition of the second layer can be such that it can be activated by exposure to heat or by a solvent. This has the advantage that a molded article produced by the injection-molding process according to the invention can be directly adhesive-bonded, or decorative elements and other elements, e.g. hooks, can be attached. Alternatively, it is also possible to select the composition in such a way that the second layer can be activated physically, for example by ultrasound or by high frequency. Alternatively, it is also possible that the second layer is designed in such a way that it can be activated by introducing heat, e.g. by infrared radiation.

The multilayer foil according to the invention can for example be produced in a simple way by an extrusion process. Processes of this type are known to the person skilled in the art and include inter alia blown-film extrusion and flat-film extrusion in the coex process and cascade process. Alternatively, the multilayer foil according to the invention can also be produced by lamination of single- and multilayer foils or by application of a melt to single-layer, multilayer, or non-plastics foils, as well as by spread application or powder-scattering application processes. By varying the polymers used to produce the second layer it becomes possible to produce without great effort a multitude of foils, which have various surface properties.

The first layer comprises, or consists of, an apolar polymer, preferably polypropylene, modified polypropylene, polyethylene, modified polyethylene, polyoxymethylene, ethyl-vinyl acetate, styrene block copolymers, ionomers, olefins, rubbers, or plastomers as well as copolymers thereof.

It is preferable that the second layer comprises, or consists of, a polar polymer, in particular selected from the group of the polyamides, copolyamides, polyesters, copolyesters, polyurethanes, polyether-block-amides, acrylates, or polycarbonates. It is particularly preferable that the second layer comprises, or consists of, an acrylonitrile-butadiene-styrene copolymer (ABS), as well as a blend thereof with polycarbonate (ABS/PC), polyamide (PA), or polyurethane (TPU).

Others additives and processing aids used in the foil industry, for example fillers or dyes, can be admixed with the polymers of the first and of the second layer.

Alternatively, the multilayer foil may possess at least one further layer between the first apolar layer and the second layer. This at least one layer can serve as adhesive-promoter or barrier layer between the first and the second layers. Further, this at least one further layer can also alter the properties of the multilayer foil, for example ultimate tensile strength, dimensional stability, harshness, or color. In a preferred embodiment, the foil consists of a first apolar layer, a layer made of an adhesion promoter, and also a second polar layer. In another preferred embodiment, the foil consists of a first apolar layer, an adhesion-promoter layer, a layer made of an elastomer, a second adhesion-promoter layer as well as a second polar layer.

The multilayer foil according to the invention moreover has (in particular by virtue of production by means of coextrusion) the advantageous property that the individual layers adhere very well to one another, and can be separated only by destroying the foil.

The use of a multilayer foil according to the invention in an in-mold coating process for producing a molded polymer article is particularly advantageous. The multilayer foil is easy to produce. It is moreover possible firstly to influence the adhesion properties with respect to the molded article by varying the polymers used for the first apolar layer and secondly to influence the surface properties of the finished molded article by varying the polymers of the second layer. In-mold coating of foils is a known process, and a wide variety of equipment required for this purpose is therefore marketed.

Another object of the present invention is to provide a molded polymer article made of an apolar polymer with a modified surface. A molded polymer article according to claim 14 achieves this object.

A molded polymer article produced by the process according to the invention has a surface with properties advantageous for further processing. The surface of the molded article is durably modified by virtue of the strong bond achievable between the molded article and the multilayer foil by the in-mold coating process.

Further advantages and individual features of the invention are apparent from the following description of embodiments and from the figures.

The following figures show:

FIG. 1: A cross section of an embodiment of a multilayer foil according to the invention FIG. 2: A cross section of an embodiment of a molded polymer article according to the invention FIG. 3: Across section of an embodiment of the injection-molding process according to the invention.

FIG. 1 shows by way of example a cross section of an embodiment of a multilayer foil 1 according to the invention. Multilayer foil 1 consists of a first apolar layer 2 and of at least one second layer 3. The second layer 3 has at least one surface property different from the first layer 2. As an alternative, there can be at least one further layer present between the first layer 2 and the second layer 3. The thickness of the multilayer foil 1, and also of the individual layers 2 and 3, can vary depending on application. The multilayer foil 1 can also take various forms, for example that of individual sheets, that of a roll, or that of a cut-to-size product with defined outlines.

By way of example, the multilayer foil 1 consists of an apolar layer 2 made of polypropylene, of an adhesion-promoter layer made of a polyamide, and of a polar layer 3 made of a polyurethane. The multilayer foil can moreover by way of example have a plurality of intermediate layers between the apolar layer 2 and the polar layer 3. By way of example, the multilayer foil 1 can consist of an apolar layer 2 made of polyethylene, of an adhesion-promoter layer made of ethylene-vinyl acetate, of an elastomeric layer made of ethylene-vinyl rubber, of another adhesion-promoter layer made of ethylene-vinyl acetate, and of a second, polar layer 3 made of a polyamide.

Figure 2:
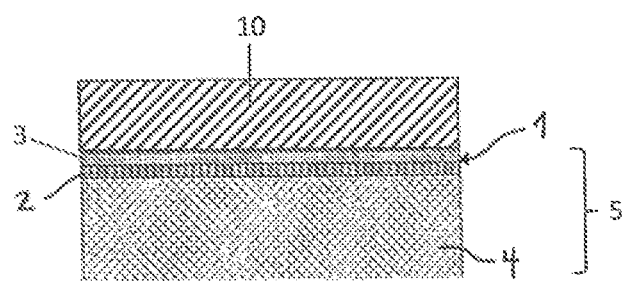

FIG. 2 shows an embodiment of a polymer molding 5 according to the invention. The polymer molding comprises a multilayer foil 1 in-mold coated with an apolar polymer 4. The apolar first layer 2 of the multilayer foil 1 faces towards polymer 4, while the second layer 3 is arranged on the (uncovered) surface of the polymer molding 5. Alternatively, a polymer molding 5 can also be produced by in-mold coating of a multilayer foil 1, which also comprises at least one further layer between the first layer 2 and the second layer 3. The polymer molding 5 can have various forms and shapes. By way of example, the polymer molding 5 can take the form of a dashboard for a motor vehicle.

Figure 3A:
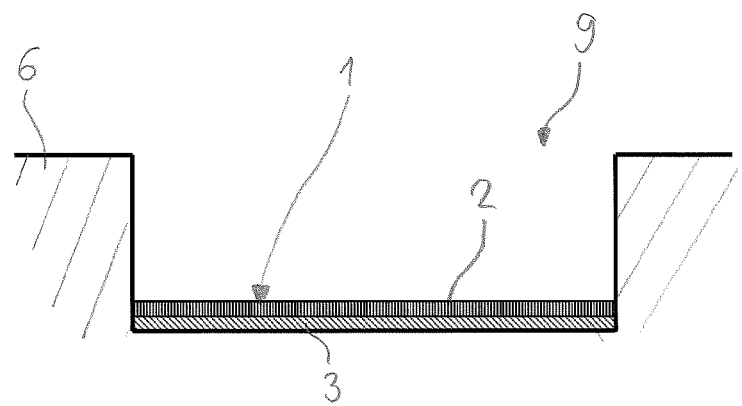
Figure 3B:
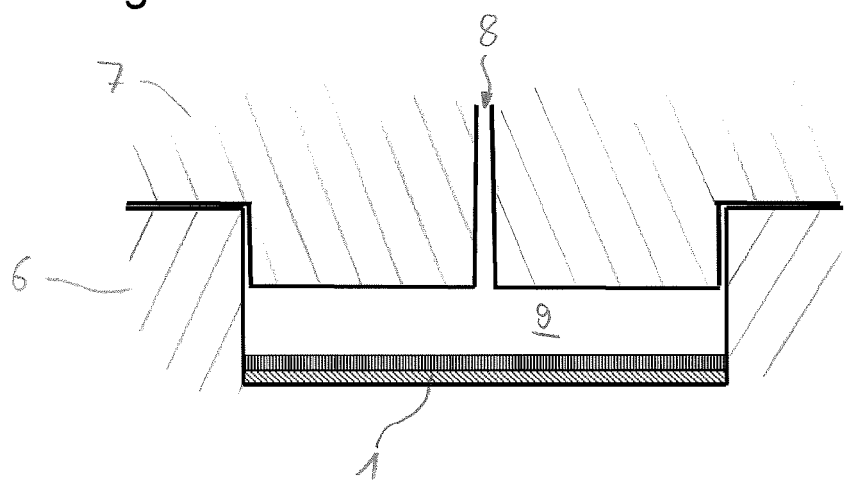
Figure 3C:
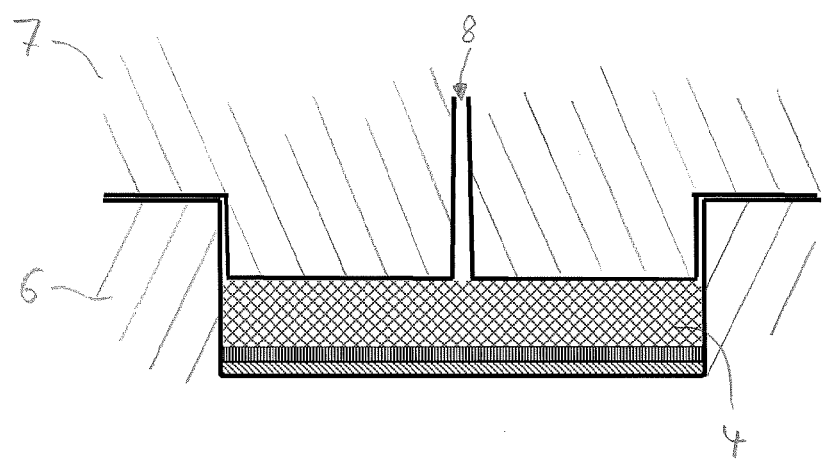

FIG. 3 shows an embodiment of the injection-molding process according to the invention. As shown in FIG. 3a, a multilayer foil 1 is first inserted into the cavity 9 of an injection mold 6. It is preferable to use an injection mold with vacuum-thermoforming capability, so that the multilayer foil 1 can conform well to the wall of the cavity 9. The first apolar layer 2 of the multilayer foil 1 faces in the direction of the cavity 9, while the second layer 3 has been oriented towards the wall of the injection mold 6. The shape of the cavity 9 depends on the shape of the molded article to be produced. FIG. 3b shows the next step, where the cylinder 7 of the injection mold 6 is lowered onto the cavity 9. A polymer 4 can then be injected into the cavity 9 through the injection channel 8. FIG. 3c shows the situation after injection of the polymer 4. Since the first apolar layer 2 and the apolar polymer 4 exhibit similar or identical surface properties, a strong bond is produced between the multilayer foil 1 and the polymer 4. By virtue of said strong bond, it is no longer possible to separate the multilayer foil 1 from the polymer 4 without at the same time destroying the molded polymer article 5. The process according to the invention therefore permits durable modification of the surface of a polymer molding made of apolar polymer.

EXAMPLE 1

A multilayer foil 1 consisting of a first, apolar layer made of maleic-anhydride-grafted polypropylene (30 g/m$^2$) and of a second, polar layer 3 made of a copolyamide (10 g/m$^2$) was in-mold coated with polypropylene to give a molding.

EXAMPLE 2

A multilayer foil 1 consisting of a first, apolar layer 2 made of a plastomer (10 g/m$^2$), of an adhesion-promoter layer made of MAH-grafted polyethylene (5 g/m$^2$) and of a second, polar layer 3 made of polyamide (5 g/m$^2$) was in-mold coated with polypropylene to give a molded article.

What is claimed is:

1. A process for directly bonding a polymer molded part (5) to a substrate (10), the process comprising:
    forming a multilayer foil (1) comprising a first apolar layer (2) and a second layer (3) in which the second layer (3) has at least one surface property which differs from surface properties of the first apolar layer (2);
    contacting the second layer (3) of the multilayer foil (1) with an internal wall of a cavity (9) of an injection mold (6) such that the first apolar layer (2) faces toward an internal space of the cavity (9);
    injecting the apolar polymer (4) into the internal space of the cavity (9) to contact the first apolar layer (2) and facilitate bonding therewith and formation of the polymer molded part (5);
    removing the polymer molded part (5) with the multilayer foil (1) from the injection mold (6);
    activating the second layer (3) to facilitate bonding of the polymer molded part (5) to the substrate; and
    following activation of the second layer (3), contacting and adhering the polymer molded part (5) to the substrate (10).

2. The process according to claim 1, further comprising activating the second layer (3) by exposure to heat, by introduction of heat, or physically.

3. The process according to claim 1, further comprising activating the second layer (3) by a solvent.

4. The process according to claim 1, further comprising activating the second layer (3) by ultrasound or by high frequency.

* * * * *